United States Patent
Haley et al.

(10) Patent No.: US 10,752,760 B2
(45) Date of Patent: Aug. 25, 2020

(54) POLYMER COMPOSITION FOR USE IN CABLES

(71) Applicant: Celanese EVA Performance Polymers Corporation, Irving, TX (US)

(72) Inventors: Jeffrey Charles Haley, Norwood, OH (US); Nagarjuna Palyam, Florence, KY (US); Christian Schneider, Hattersheim (DE); Chelsea Ringham, Florence, KY (US)

(73) Assignee: Celanese EVA Performance Polymers Corporation, Irving, TX (US)

( * ) Notice: Subject to any disclaimer, the term of this patent is extended or adjusted under 35 U.S.C. 154(b) by 37 days.

(21) Appl. No.: 16/019,611

(22) Filed: Jun. 27, 2018

(65) Prior Publication Data

US 2019/0002677 A1    Jan. 3, 2019

Related U.S. Application Data

(60) Provisional application No. 62/526,117, filed on Jun. 28, 2017.

(51) Int. Cl.

| | |
|---|---|
| *C08L 31/04* | (2006.01) |
| *C08K 3/06* | (2006.01) |
| *C08L 23/08* | (2006.01) |
| *C08L 33/02* | (2006.01) |
| *C08L 33/08* | (2006.01) |
| *C08L 33/10* | (2006.01) |
| *C08K 3/22* | (2006.01) |
| *C08K 5/098* | (2006.01) |
| *H01B 7/295* | (2006.01) |
| *H01B 7/18* | (2006.01) |
| *H01B 3/44* | (2006.01) |

(52) U.S. Cl.
CPC ............ *C08L 23/0853* (2013.01); *C08K 3/22* (2013.01); *C08K 5/098* (2013.01); *C08L 23/0876* (2013.01); *C08L 33/02* (2013.01); *C08L 33/08* (2013.01); *C08L 33/10* (2013.01); *H01B 3/446* (2013.01); *H01B 7/185* (2013.01); *H01B 7/295* (2013.01); *C08K 2003/2224* (2013.01); *C08K 2003/2227* (2013.01); *C08K 2201/005* (2013.01); *C08L 2201/02* (2013.01); *C08L 2203/202* (2013.01); *C08L 2207/062* (2013.01); *C08L 2207/066* (2013.01)

(58) Field of Classification Search
CPC .. C08L 31/04; C08L 23/0853; C08L 23/0876; C08L 33/10; C08L 33/08; C08L 33/02; C08L 2207/066; C08L 2207/062; C08L 2203/202; C08L 2201/02; C08K 3/016; C08K 5/098; C08K 3/22; C08K 2003/2227; C08K 2003/2224; C08K 2201/005; H01B 3/446; H01B 7/185; H01B 7/295

See application file for complete search history.

(56) References Cited

U.S. PATENT DOCUMENTS

| | | |
|---|---|---|
| 2,425,389 A | 8/1947 | Oxley et al. |
| 2,859,241 A | 11/1958 | Schnizer |
| 3,832,326 A | 8/1974 | North et al. |
| 4,255,303 A | 3/1981 | Keogh |
| 4,320,038 A | 3/1982 | Keogh |
| 4,322,575 A | 3/1982 | Skipper |
| 4,370,076 A | 1/1983 | Sullivan et al. |
| 4,378,463 A | 3/1983 | Senior et al. |
| 4,477,523 A | 10/1984 | Biggs et al. |
| 4,843,170 A | 6/1989 | Isshiki et al. |
| 5,191,004 A | 3/1993 | Maringer et al. |
| 5,955,525 A | 9/1999 | Sanchez et al. |
| 6,477,523 B1 | 11/2002 | Chiang |
| 8,129,619 B2 * | 3/2012 | Moriuchi ............... C08L 31/04 174/110 R |
| 8,987,597 B2 * | 3/2015 | Tai ....................... C08G 18/4238 174/110 R |
| 9,126,549 B2 | 9/2015 | Shimanaka |
| 9,540,550 B2 * | 1/2017 | Wu ........................ C08L 33/08 |
| 9,896,576 B2 | 2/2018 | Zhang et al. |
| 9,997,280 B2 | 6/2018 | Nakamura et al. |
| 2005/0205290 A1 | 9/2005 | Pinacci et al. |
| 2010/0319960 A1 | 12/2010 | Cree et al. |
| 2017/0121513 A1 * | 5/2017 | Zhang ................ A61M 25/0021 |

OTHER PUBLICATIONS

ASTM D570-98 (Reapproved 2010)—Water Absorption of Plastics, ASTM International, Apr. 1. 2010, 4 pages.
International Search Report and Written Opinion for PCT/US2018/039776 dated Sep. 18, 2018, 10 pages.

* cited by examiner

Primary Examiner — Sanza L. McClendon
(74) Attorney, Agent, or Firm — Dority & Manning, P.A.

(57) ABSTRACT

A polymer composition that comprises an olefinic polymer, a flame retardant that includes a halogen-free mineral filler, and a compatibilizing agent is provided. The halogen-free mineral filler constitutes from about 20 wt. % to about 80 wt. % of the composition. The composition may exhibit a degree of water uptake of about 5 wt. % or less after being immersed in water for seven days at a temperature of 23° C.

25 Claims, 2 Drawing Sheets

US 10,752,760 B2

POLYMER COMPOSITION FOR USE IN CABLES

RELATED APPLICATIONS

The present application claims priority to U.S. Application Ser. No. 62/526,117 (filed on Jun. 28, 2017), which is incorporated herein in its entirety by reference thereto.

BACKGROUND OF THE INVENTION

Electrical cables often contain protective jackets formed from LSZH materials that emit a limited amount of smoke and zero halogens when exposed to flames or other sources of heat. To achieve these properties, polymers are often blended with mineral flame retardants that inhibit or delay the spread of fire by suppressing the chemical reactions in the flame or by the formation of a protective layer on the surface of a material. One common mineral flame retardant is aluminum trihydrate ("ATH"). When exposed to high temperatures, water molecules from this filler can be released in an endothermic reaction, which quench the surface of the surrounding materials and can thus provide a degree of flame retardance and smoke suppression. Unfortunately, the mineral flame retardants are generally employed in very high levels, which can lead to increased water uptake and also make the composition brittle. As such, a need currently exists for an improved polymer composition for use in cables.

SUMMARY OF THE INVENTION

In accordance with one embodiment of the present invention, a polymer composition is disclosed that comprises an olefinic polymer, a flame retardant that includes a halogen-free mineral filler, and a compatibilizing agent. The halogen-free mineral filler constitutes from about 20 wt. % to about 80 wt. % of the composition. Further, the composition exhibits a degree of water uptake of about 5 wt. % or less after being immersed in water for seven days at a temperature of 23° C. In accordance with another embodiment of the present invention, a cable that includes an elongated protective member that defines a passageway for receiving one or more items is disclosed. The protective member includes the polymer composition comprising an olefinic polymer, a flame retardant that includes a halogen-free mineral filler, and a compatibilizing agent. The halogen-free mineral filler constitutes from about 20 wt. % to about 80 wt. % of the composition.

Other features and aspects of the present invention are set forth in greater detail below.

BRIEF DESCRIPTION OF THE FIGURES

The present invention may be better understood with reference to the following figures.

DETAILED DESCRIPTION

Figure 1:
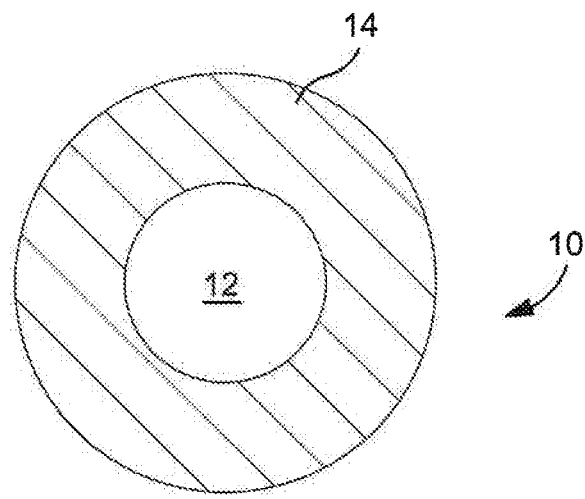
FIG. 1 is a schematic cross-sectional view of one embodiment of an electrical cable that may employ the polymer composition of the present invention.

It is to be understood by one of ordinary skill in the art that the present discussion is a description of exemplary embodiments only, and is not intended as limiting the broader aspects of the present invention.

Generally speaking, the present invention is directed to a polymer composition that is suitable for use in cables. More particularly, the polymer compositions may contain an olefinic polymer, flame retardant, and compatibilizing agent. By selectively controlling specific aspects of the components of the composition, as well as their relative concentrations, the present inventors have surprisingly discovered that the resulting composition can exhibit a unique combination of a low degree of water uptake and good ductility. For example, the composition may exhibit a degree of water uptake of about 5 wt. % or less, in some embodiments about 2 wt. % or less, in some embodiments about 1 wt. % or less, and in some embodiments, from about 0.01 wt. % to about 0.5 wt. %, after being immersed in water for seven (7) days at a temperature of 23° C. or 70° C. Despite having such a low degree of water uptake, the composition may nevertheless remain ductile in that it may exhibit a tensile elongation at break of about 100% or more, in some embodiments about 150% or more, in some embodiments about 400% or more, in some embodiments about 800% or more, in some embodiments about 850% or more, and in some embodiments, from about 900% to about 1,500%, as determined in accordance with ISO Test No. 527-1:2012 (technically equivalent to ASTM D638-14) at 23° C.

The composition may also be flame retardant, which can be quantified in a variety of different ways. For example, the degree to which the composition can retard a fire ("char formation") may be represented by its Limiting Oxygen Index ("LOI"), which is the volume percentage of oxygen needed to support combustion. More particularly, the LOI of the polymer composition may be about 35 or more, in some embodiments about 40 or more, and in some embodiments, from about 50 to 100, as determined in accordance with ASTM D2863-13. Another parameter that represents the flammability of a composition is the peak rate of heat release, which generally expresses the maximum intensity of a fire. The polymer composition may, for example, exhibit a peak heat release rate of about 200 kW/m$^2$ or less, in some embodiments from about 10 to about 180 kW/m$^2$, and in some embodiments, from about 20 to about 150 kW/m$^2$, as measured by a cone calorimeter in accordance with ASTM E1354-16a. Yet another property that represents the flammability of the composition is the maximum average rate of heat emission, which expresses the sustained heat supplied by combustion of the composition. The polymer composition of the present invention may, for example, exhibit a maximum average rate of heat emission of about 150 kW/m$^2$ or less, in some embodiments from about 10 to about 100 kW/m$^2$, in some embodiments, from about 20 to about 80 kW/m$^2$, as measured by a cone calorimeter in accordance with ASTM E1354-16a.

In addition to possessing flame retardant properties, the polymer composition may also exhibit a relatively low degree of smoke production. For example, the polymer composition may exhibit a maximum smoke density ("$D_s$") that is about 250 or less, in some embodiments about 200 or less, and in some embodiments, from about 5 to about 150, as determined at an exposure period of 4 minutes in accordance with the smoke density test as set forth in ASTM E662-17. The composition may also exhibit an average specific extinction area (smoke production) of about 0.800 m$^2$/g or less, in some about 0.500 m$^2$/g or less, and in some embodiments, from about 0.050 to about 0.450 m$^2$/g, as measured by a cone calorimeter in accordance with ASTM E1354-16a.

Various embodiments of the present invention will now be described in further detail.

I. Polymer Composition

A. Olefinic Polymer

Olefinic polymers generally constitute from about 20 wt. % to about 75 wt. %, in some embodiments from about 30 wt. % to about 70 wt. %, and in some embodiments, from about 40 wt. % to about 60 wt. % of the polymer composition. A wide variety of olefin polymers may be employed in the polymer composition, such as ethylene polymers (e.g., low density polyethylene ("LDPE"), high density polyethylene ("HDPE"), linear low density polyethylene ("LLDPE"), etc.), propylene homopolymers (e.g., syndiotactic, atactic, isotactic, etc.), propylene copolymers, olefin-diene copolymers, ethylene vinyl acetate copolymers, ethylene (meth)acrylic acid polymers (e.g., ethylene acrylic acid copolymers and partially neutralized ionomers of these copolymers, ethylene methacrylic acid copolymers and partially neutralized ionomers of these copolymers, etc.), ethylene (meth)acrylate polymers (e.g., ethylene methylacrylate copolymers, ethylene ethyl acrylate copolymers, ethylene butyl acrylate copolymers, etc.), and so forth.

In one particular embodiment, for example, the polymer composition may contain an ethylene vinyl acetate polymer, which is defined as a copolymer that contains at least one ethylene monomer and at least one vinyl acetate monomer. When employed, the present inventors have discovered that certain aspects of the ethylene vinyl acetate polymer can also be selectively controlled to help achieve the desired properties. For instance, the ethylene vinyl acetate polymer may be selectively controlled so that it has a vinyl acetate content of from about 10 wt. % to about 45 wt. %, in some embodiments about 15 wt. % to about 43 wt. %, and in some embodiments, from about 20 wt. % to about 40 wt. %. The density of the ethylene vinyl acetate polymer may also range from about 0.900 to about 1.00 gram per cubic centimeter (g/cm$^3$), in some embodiments from about 0.910 to about 0.980 g/cm$^3$, and in some embodiments, from about 0.930 to about 0.960 g/cm$^3$, as determined in accordance with ASTM D1505-10. Still further, the melt flow index of the ethylene vinyl acetate polymer may range from about 0.1 to about 30 g/10 min, in some embodiments from about 0.5 to about 20 g/10 min, and in some embodiments, from about 1 to about 10 g/10 min, as determined in accordance with ASTM D1238-13 at a temperature of 190° C. and a load of 2.16 kilograms. The melting point may also range from about 60° C. to about 120° C., and in some embodiments, from about 75° C. to about 100° C., as determined in accordance with ASTM D3418-15. Examples of suitable ethylene vinyl acetate polymers that may be employed include those available from Celanese under the designation ATEVA® (e.g., ATEVA® 2861A or 2803W); DuPont under the designation ELVAX® (e.g., ELVAX® 265 or 260); and Arkema under the designation EVATANE® (e.g., EVATANE 28-03).

In certain embodiments, blends of olefinic polymers may be employed to help achieve the desired balance between a low degree of water uptake and good ductility. For example, in one embodiment, an ethylene vinyl acetate polymer having a relatively low vinyl acetate content may be employed in combination with an ethylene vinyl acetate rubber having a relatively high vinyl acetate content. The ethylene vinyl acetate polymer may, for example, have a vinyl acetate content of from about 10 wt. % to about 38 wt. %, in some embodiments about 15 wt. % to about 35 wt. %, and in some embodiments, from about 20 wt. % to about 30 wt. %, while the ethylene vinyl acetate rubber may have a vinyl acetate content of from about 38 wt. % to about 95 wt. %, in some embodiments about 39 wt. % to about 90 wt. %, and in some embodiments, from about 40 wt. % to about 85 wt. %. A specific example of such an ethylene vinyl acetate rubber is available from Celanese under the trade designation ATEVA® 4030ACX (vinyl acetate content of 40 wt. %). In such embodiments, the ratio of the weight percentage of the ethylene vinyl acetate polymer to the weight percentage of the ethylene vinyl acetate rubber is typically from about 1 to about 30, in some embodiments from about 2 to about 20, and in some embodiments, from about 5 to about 15.

Any of a variety of techniques may generally be used to form the ethylene vinyl acetate polymer with the desired properties as is known in the art. In one embodiment, the polymer is produced by copolymerizing an ethylene monomer and a vinyl acetate monomer in a high pressure reaction. Vinyl acetate may be produced from the oxidation of butane to yield acetic anhydride and acetaldehyde, which can react together to form ethylidene diacetate. Ethylidene diacetate can then be thermally decomposed in the presence of an acid catalyst to form the vinyl acetate monomer. Examples of suitable acid catalysts include aromatic sulfonic acids (e.g., benzene sulfonic acid, toluene sulfonic acid, ethylbenzene sulfonic acid, xylene sulfonic acid, and naphthalene sulfonic acid), sulfuric acid, and alkanesulfonic acids, such as described in U.S. Pat. No. 2,425,389 to Oxley et al.; U.S. Pat. No. 2,859,241 to Schnizer; and U.S. Pat. No. 4,843,170 to Isshiki et al. The vinyl acetate monomer can also be produced by reacting acetic anhydride with hydrogen in the presence of a catalyst instead of acetaldehyde. This process converts vinyl acetate directly from acetic anhydride and hydrogen without the need to produce ethylidene diacetate. In yet another embodiment, the vinyl acetate monomer can be produced from the reaction of acetaldehyde and a ketene in the presence of a suitable solid catalyst, such as a perfluorosulfonic acid resin or zeolite.

B. Flame Retardant

The polymer composition contains a flame retardant, which generally includes at least one halogen-free mineral filler. In this manner, the resulting polymer composition can maintain a relatively low content of halogens (i.e., bromine, fluorine, and/or chlorine) of about 10,000 parts per million ("ppm") or less, in some embodiments about 5,000 ppm or less, in some embodiments about 1,000 ppm or less, in some embodiments about 600 ppm or less, and in some embodiments, from about 1 ppm to about 400 ppm. Halogen-free mineral filler flame retardants may, for instance, constitute from about 20 wt. % to about 80 wt. %, in some embodiments from about 30 wt. % to about 75 wt. %, and in some embodiments, from about 40 wt. % to about 65 wt. % of the polymer composition.

One type of suitable halogen-free mineral filler for use as a flame retardant may be a metal hydroxide, which can effectively release water at a certain temperature. Among other things, the released water can help dilute a combustion gas while the endothermic reaction removes heat from a fire. The remaining metal oxide can also enhance the degree of char formation, which further slows flame propagation. An example of such a compound is a metal hydroxide having the general formula $M(OH)_s$, where s is the oxidation state (typically from 1 to 3) and M is a metal, such as a transition metal, alkali metal, alkaline earth metal, or main group metal. Specific examples of suitable metal hydroxides may include copper hydroxide ($Cu(OH)_2$), magnesium hydroxide ($Mg(OH)_2$), calcium hydroxide ($Ca(OH)_2$), aluminum trihydroxide ($Al(OH)_3$), and so forth. Besides metal hydroxides, other types of halogen-free mineral fillers may also be employed as flame retardants in the polymer composition, such as metal molybdate compounds (e.g., ammonium octamolybdate, zinc molybdate, calcium zinc molybdate, etc.), metal borates (e.g., zinc borate), metal molybdate/borate complexes (e.g., zinc molybdate/zinc borate), phosphorous compounds (e.g., red phosphorous), and so forth. Regardless of the materials from which it is formed, the mineral filler is typically provided in the form of particles. The particles may have a relatively small size, such as a median size (e.g., diameter) of from about 50 nanometers to about 3,000 nanometers, in some embodiments from about 100 nanometers to about 2,000 nanometers, and in some embodiments, from about 500 nanometers to about 1,500 nanometers. The term "median" size as used herein refers to the "D50" size distribution of the particles, which is the point at which 50% of the particles have a smaller size. The particles may likewise have a D90 size distribution within the ranges noted above. The diameter of particles may be determined using known techniques, such as by ultracentrifuge, laser diffraction, etc. For example, particle size distribution can be determined according to a standard testing method such as ISO 13320:2009.

Of course, halogen-free flame retardants can also be employed that are not considered mineral fillers, such as organophosphorous compounds, such as organophosphates (e.g., triphenyl phosphate, resorcinol bis(diphenylphosphate), bisphenol A diphenyl phosphate, tricresyl phosphate, etc.), phosphonates (e.g., dimethyl methylphosphonate), phosphinates (e.g., aluminum diethyl phosphinate), and so forth.

C. Compatibilizing Agent

As noted above, the polymer composition contains at least one compatibilizing agent. The amount of compatibilizing agents employed in the composition is typically controlled so that the polymer composition can achieve the desired degree of water uptake and mechanical properties, but not so high so as to adversely impact other properties of the resulting composition. For instance, compatibilizing agents typically constitute from about 0.1 wt. % to about 6 wt. %, in some embodiments from about 0.2 wt. % to about 4 wt. %, and in some embodiments, from about 0.5 wt. % to about 2 wt. %, based on the weight of olefinic polymers in the composition. In certain embodiments, compatibilizing agents may constitute from about 0.05 wt. % to about 5 wt. %, in some embodiments from about 0.1 wt. % to about 2 wt. %, and in some embodiments, from about 0.2 wt. % to about 1 wt. % of the entire polymer composition.

Suitable compatibilizing agents may include, for instance, fatty acids, fatty acid derivatives (e.g., esters, amides, and/or salts of fatty acids), waxes (e.g., polyethylene wax), and so forth. Fatty acids and fatty acid derivatives are particularly suitable for use in the polymer composition. The fatty acids typically include any saturated or unsaturated acid having a carbon chain length of from about 8 to 22 carbon atoms, and in some embodiments, from about 10 to about 18 carbon atoms. If desired, the acid may be substituted. Suitable fatty acids may include, for instance, lauric acid, myristic acid, behenic acid, oleic acid, palmitic acid, stearic acid, ricinoleic acid, capric acid, neodecanoic acid, hydrogenated tallow fatty acid, hydroxy stearic acid, the fatty acids of hydrogenated castor oil, erucic acid, coconut oil fatty acid, etc., as well as mixtures thereof. In one embodiment, for example, stearic acid may be employed. As noted, salts, ester, and/or amides of such fatty acids may also be employed. For example, a fatty acid salt may include and a metal cation, such as zinc, aluminum, magnesium, calcium, sodium, lithium, etc., as well as mixtures thereof. The anion of the metal salt may be a carboxylate derived from a fatty acid such as described above. Exemplary metal salts may include zinc stearate, aluminum stearate, calcium stearate, magnesium stearate, lithium stearate, sodium stearate, etc., as well as combinations thereof. Mixtures of compatibilizing agents may also be employed. In fact, the present inventors have discovered that the use of a mixture of a fatty acid and fatty acid salt can achieve even better properties than either of the additives when used alone. Typically, the carboxylate anion of the salt is derived from the same fatty acid that is employed in the mixture. In one embodiment, for instance, a stearate anion (e.g., zinc stearate salt) is employed when the fatty acid includes stearic acid. Regardless, the weight ratio of fatty acids to the fatty acids salts may be from about 0.5 to about 2.0, in some embodiments from about 0.6 to about 1.5, and in some embodiments, from about 0.8 to about 1.2 (e.g., about 1.0).

D. Optional Additives

The polymer composition may optionally contain one or more additives if so desired, such as crosslinking agents, flow aids, antimicrobials, fillers pigments, antioxidants, stabilizers, surfactants, waxes, solid solvents, anti-drip additives, and other materials added to enhance properties and processability. When employed, the optional additive(s) typically constitute from about 0.001 wt. % to about 50 wt. %, and in some embodiments, from about 0.01 wt. % to about 40 wt. %, and in some embodiments, from about 0.02 wt. % to about 30 wt. % of the composition. In one embodiment, for instance, the composition may contain filler particles other than the halogen-free flame retardants referenced above. Examples of such particles include, for instance, carbonates, such as calcium carbonate; fluorides, such as calcium fluoride; phosphates, such as calcium pyrophosphate, anhydrous dicalcium phosphate, or hydrated aluminum phosphate; silicates, such as silica, potassium aluminum silicate, talc, mica, copper silicate; borates, such as calcium borosilicate hydroxide; alumina; sulfates, such as calcium sulfate or barium sulfate; and so forth, as well as combinations thereof.

II. Melt Blending

Generally speaking, the olefin polymer, flame retardant, compatibilizing agent, and other optional additives may be melt blended together to form the polymer composition. Melt blending may occur at a temperature range of from about 60° C. to about 200° C., in some embodiments, from about 80° C. to about 180° C., and in some embodiments, from about 100° C. to about 150° C. to form the polymer composition. Any of a variety of melt blending techniques may generally be employed in the present invention. For example, the components may be supplied separately or in combination to an extruder that includes at least one screw rotatably mounted and received within a barrel (e.g., cylindrical barrel). The extruder may be a single screw or twin screw extruder. For example, one embodiment of a single screw extruder may contain a housing or barrel and a screw rotatably driven on one end by a suitable drive (typically including a motor and gearbox). If desired, a twin-screw extruder may be employed that contains two separate screws. The configuration of the screw is not particularly critical to the present invention and it may contain any number and/or orientation of threads and channels as is known in the art. For example, the screw typically contains a thread that forms a generally helical channel radially extending around a core of the screw. A feed section and melt section may be defined along the length of the screw. The feed section is the input portion of the barrel where the ethylene vinyl acetate polymer, flame retardant, and/or compatibilizing agent are added. The melt section is the phase change section in which the polymer is changed from a solid to a liquid. While there is no precisely defined delineation of these sections when the extruder is manufactured, it is well within the ordinary skill of those in this art to reliably identify the feed section and the melt section in which phase change from solid to liquid is occurring. Although not necessarily required, the extruder may also have a mixing section that is located adjacent to the output end of the barrel and downstream from the melting section. If desired, one or more distributive and/or dispersive mixing elements may be employed within the mixing and/or melting sections of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

If desired, the ratio of the length ("L") to diameter ("D") of the screw may be selected to achieve an optimum balance between throughput and blending of the components. The L/D value may, for instance, range from about 15 to about 50, in some embodiments from about 20 to about 45, and in some embodiments from about 25 to about 40. The length of the screw may, for instance, range from about 0.1 to about 5 meters, in some embodiments from about 0.4 to about 4 meters, and in some embodiments, from about 0.5 to about 2 meters. The diameter of the screw may likewise be from about 5 to about 150 millimeters, in some embodiments from about 10 to about 120 millimeters, and in some embodiments, from about 20 to about 80 millimeters. In addition to the length and diameter, other aspects of the extruder may also be selected to help achieve the desired degree of blending. For example, the speed of the screw may be selected to achieve the desired residence time, shear rate, melt processing temperature, etc. For example, the screw speed may range from about 10 to about 800 revolutions per minute ("rpm"), in some embodiments from about 20 to about 500 rpm, and in some embodiments, from about 30 to about 400 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

III. Crosslinking

Although by no means required, the polymer composition of the present invention can optionally be "crosslinked" to the extent that at least one polymer within the composition is bonded to itself or another polymer. For example, the olefinic polymer may be crosslinked prior to being melt blended with other components of the composition. Likewise, crosslinking may also occur after melt blending the olefinic polymer with other components of the composition. Crosslinking is typically achieved through the formation of free radicals (unpaired electrons) that link together to form a plurality of carbon-carbon covalent bonds at the monomer units of one or more polymers (e.g., ethylene vinyl acetate polymer and/or viscoelastic additive). Such free radical formation may be induced through a wide variety of known techniques, such as through chemical crosslinking (e.g., in the presence of a crosslinking agent), electromagnetic radiation, etc. Chemical crosslinking may occur, for instance, at a temperature of from about 100° C. to about 300° C., in some embodiments from about 120° C. to about 280° C., and in some embodiments, from about 150° C. to about 250° C. In one embodiment, an organic peroxide may be employed as a crosslinking agent. Suitable organic peroxides may include those of the aliphatic hydrocarbon, aromatic hydrocarbon, carboxylic acid ester, ketone, or carbonic acid ester types, and specific examples include diisopropyl peroxide, ditertiary butyl peroxide, tertiary butyl hydroperoxide, dicumyl peroxide, dibenzoyl peroxide, cumyl hydroperoxide, tertiary butyl peracetate, tertiary butyl peroxy laurate, tertiary butyl perbenzoate, ditertiary butyl perphthalate, methylethylketone peroxide, octanol peroxide, and diisopropyl peroxycarbonate. When employed, it is typically desired that crosslinking agents are present in an amount of from about 0.1 wt. % to about 10 wt. %, in some embodiments from about 0.5 wt. % to about 8 wt. %, and in some embodiments, from about 1 wt. % to 5 wt. %, based on weight of the olefinic polymers employed in the polymer composition. Likewise, the crosslinking agents may be present in an amount of from about 0.05 wt. % to about 8 wt. %, in some embodiments from about 0.1 wt. % to about 4 wt. %, and in some embodiments, from about 0.5 wt. % to 2 wt. %, based on weight of the entire polymer composition.

III. Shaped Parts

The polymer composition may be employed in a wide variety of different types of shaped parts using various techniques. In certain embodiments, for instance, a shaped part may be formed by a molding technique, such as injection molding, compression molding, nanomolding, overmolding, blow molding, etc. Compression molding, for instance, generally includes applying pressure to the polymer composition to form a desired shape, such as sheet, billet, plaque, etc. In some embodiments, compression molding may further include increasing the temperature while applying pressure, such as to a temperature of from about 100° C. to about 300° C., in some embodiments from about 120° C. to about 280° C., and in some embodiments, from about 150° C. to about 250° C. If desired, any optional crosslinking within the polymer composition can occur during this stage.

Although any suitable shaped part can be formed, the polymer composition of the present invention is particularly useful in cables. Generally speaking, a cable includes an elongated protective member that defines a passageway for receiving one or more items, such as a conductor, fluid, etc. The passageway and cable may have a cross-sectional dimension that is substantially circular. Of course, any of a variety of other shapes may also be employed, such as a polygonal (e.g., square or rectangular) cross-sectional shape. The elongated protective member may contain multiple layers or a single layer. Electrical cables, for instance, typically contain a protective member (also referred to as a jacket) that is insulative in nature and that covers one or multiple conductors, which may themselves optionally be insulated and/or bound together. Signals carried by a cable may include electrical and/or optical signals. The conductor(s) may, for instance, include metal wires (e.g., copper wire), telephone lines, fiber optic cables, telecommunications cables, electrical transmission/distribution lines, lines for promoting support of elevated structures (e.g., guide wires), etc.

Figure 2:
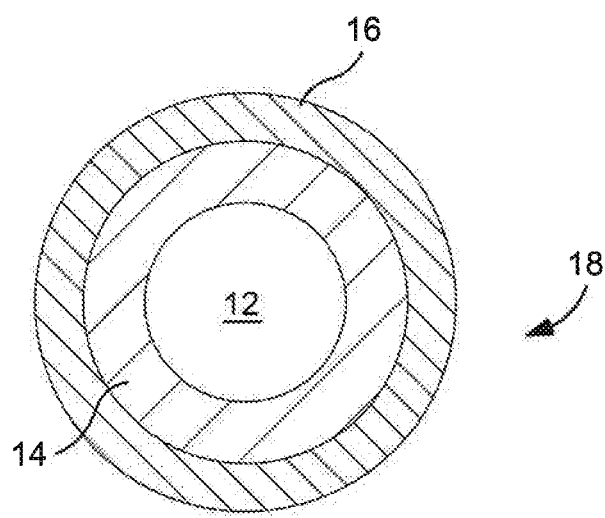
FIG. 2 is a schematic cross-sectional view of another embodiment of an electrical cable that may employ the polymer composition of the present invention.
Figure 3:
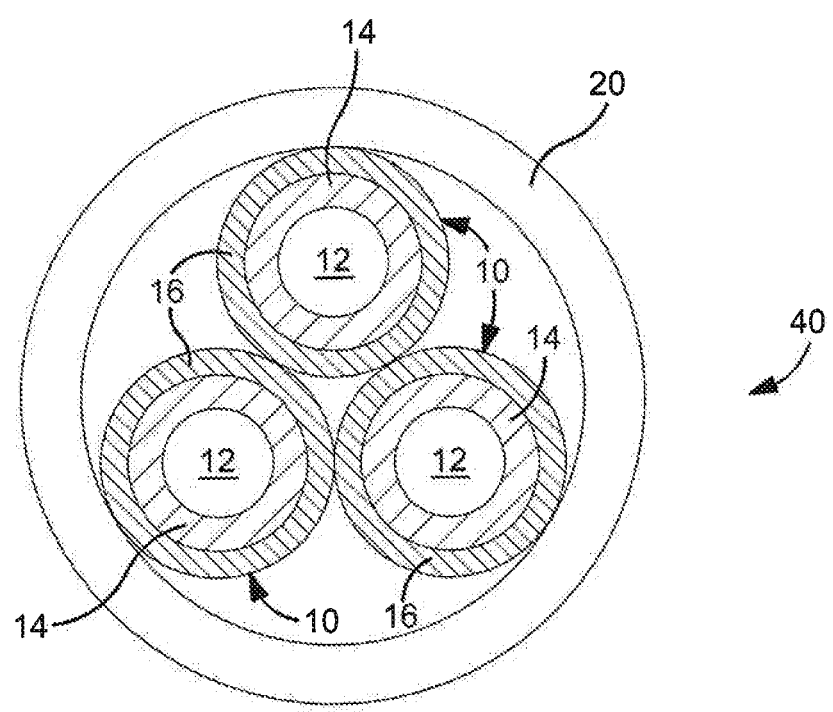
FIG. 3 is a schematic cross-sectional view of yet another embodiment of an electrical cable that may employ the polymer composition of the present invention.

Referring to FIG. 1, for instance, one particular embodiment of an electrical cable 10 is shown that includes a single-layer protective member 14 that covers a conductor 12 (e.g., copper wire). If desired, the protective member 14 may be formed from the polymer composition of the present invention. Another embodiment of the electrical cable 10 is shown in FIG. 2. In this particular embodiment, the protective member contains multiple layers, i.e., an outer layer 16 and an inner layer 14, one or both of which may be formed from the polymer composition of the present invention. For example, the outer layer 16 may be formed from the polymer composition of the present invention, while the inner layer 14 may be formed from a metallic shield material. Yet another embodiment of an electrical cable is shown in FIG. 3 as element 40. In this embodiment, the cable 40 contains a plurality of individual cables 10, which may optionally be formed as described above and shown in FIG. 2. The individual cables 10 are bound or twisted together and enclosed within a protective member 20, which may be formed from the polymer composition of the present invention.

The present invention may be better understood with reference to the following examples.

Test Methods

Water Uptake:

Water uptake may be determined by immersing a sample in a water bath (at 70° C. or 23° C.) for seven (7) days. The weight of the sample is measured before immersion and then immediately after the 7-day immersion period. The "water uptake" is then calculated as a percent weight increase of the sample. The test may also be performed in accordance with the conditions specified in ASTM D570-98(2010)e1 (technically equivalent to ISO 62:2008).

Tensile Properties:

Tensile properties (e.g., tensile elongation at break) may be tested according to ISO Test No. 527-1:2012 (technically equivalent to ASTM D638-14). The measurements may be made on a test strip sample having a length of 80 mm, thickness of 10 mm, and width of 4 mm. The testing temperature may be 23° C. and the testing speeds may be 1 or 5 mm/min. Five (5) may be tested and the results may be reported as the median value.

Chlorine Content:

Chlorine content can be determined according to an elemental analysis using Parr Bomb combustion followed by Ion Chromatography.

Limiting Oxygen Index:

The Limiting Oxygen Index ("LOI") may be determined by ASTM D2863-13, which may be technically equivalent to ISO 4589-1:2017. LOI is the minimum concentration of oxygen that will just support flaming combustion in a flowing mixture of oxygen and nitrogen. More particularly, a specimen may be positioned vertically in a transparent test column and a mixture of oxygen and nitrogen may be forced upward through the column. The specimen may be ignited at the top. The oxygen concentration may be adjusted until the specimen just supports combustion. The concentration reported is the volume percent of oxygen at which the specimen just supports combustion.

Peak Heat Release Rate:

This value represents the peak heat release rate ($kW/m^2$) as determined in accordance with ASTM E1354-16a.

Maximum Average Rate of Heat Emission:

This value represents the maximum average rate of heat emission ($kW/m^2$) as determined in accordance with ASTM E1354-16a.

Average Specific Extinction Area:

This value represents the average area of smoke ($m^2/kg$) generated during a flammability test conducted in accordance with ASTM E1354-16a.

Melting Temperature:

The melting temperature ("Tm") may be determined by differential scanning calorimetry ("DSC") as is known in the art. The melting temperature is the differential scanning calorimetry (DSC) peak melt temperature as determined by ISO 11357-1:2016. Under the DSC procedure, samples may be heated and cooled at 20° C. per minute as stated in ISO 10350-2:2011 using DSC measurements conducted on a TA Q2000 Instrument.

Example 1

A sample is formed by compounding 50 wt. % ATEVA® 2861A (vinyl acetate=28%, melt index=6 dg/min), 49 wt. % HYDRAL 710 (aluminum trihydrate), and 1 wt. % dicumyl peroxide in a Haake mixer at a temperature of 140° C. The sample is then compression molded into a test plaque having a size of 3 cm×4 cm×1 mm (ASTM D4703-16, ISO 295:2004) and cured in a hot press at 180° C. for 20 minutes. The resulting test plaque was determined to have a water uptake (70° C.) of 10 wt. %.

Example 2

A test plaque is formed as described in Example 1, except that the sample used to form the plaque contained 50 wt. % HYDRAL 710, 48.5% ATEVA® 2861A, 1 wt. % dicumyl peroxide, and 0.5 wt. % zinc stearate. The test plaque was determined to have a water uptake (70° C.) of 3 wt. %.

Example 3

A test plaque is formed as described in Example 1, except that the sample used to form the plaque contained 50 wt. % HYDRAL 710, 48.5% ATEVA® 2861A, 1 wt. % dicumyl peroxide, and 0.5 wt. % maleic anhydride-grafted polyethylene wax (LICOCENE PE MA 4351). The test plaque was determined to have a water uptake (70° C.) of 3 wt. %.

Example 4

A sample is formed by compounding 50 wt. % ATEVA® 2803W (vinyl acetate=28%, melt index=3 dg/min), 49 wt. % HYDRAL 710, and 1 wt. % dicumyl peroxide in a Haake mixer at a temperature of 140° C. The sample is then compression molded into a test plaque having a size of 3 cm×4 cm×1 mm (ASTM D4703-16, ISO 295:2004) and cured in a hot press at 180° C. for 20 minutes. The resulting test plaque was determined to have a water uptake (70° C.) of 6 wt. %.

Example 5

A test plaque is formed as described in Example 4, except that the sample used to form the plaque contained 50 wt. % HYDRAL 710, 48.5% ATEVA® 2803W, 1 wt. % dicumyl peroxide, 0.25 wt. % stearic acid, and 0.25 wt. % zinc stearate. The test plaque was determined to have a water uptake (70° C.) of 3 wt. %.

Example 6

A sample is formed by compounding 50 wt. % ATEVA® 2803W and 50 wt. % HYDRAL 710 in a Haake mixer at a temperature of 140° C. The sample is then compression molded into a test plaque having a size of 3 cm×4 cm×1 mm (ASTM D4703-16, ISO 295:2004). The resulting test plaque was determined to have a water uptake (23° C.) of 0.2 wt. %. Further, the tensile elongation at break was also determined to be 750%.

Example 7

A test plaque is formed as described in Example 6, except that the sample used to form the plaque contained 50 wt. % HYDRAL 710, 49.5% ATEVA® 2803W, and 0.5 wt. % stearic acid. The test plaque was determined to have a water uptake (23° C.) of 0.1 wt. %. Further, the tensile elongation at break was also determined to be 870%.

Example 8

A test plaque is formed as described in Example 6, except that the sample used to form the plaque contained 50 wt. % HYDRAL 710, 49.5% ATEVA® 2803W, and 0.5 wt. % zinc stearate. The test plaque was determined to have a water uptake (23° C.) of 0.1 wt. %. Further, the tensile elongation at break was also determined to be 1,000%.

Example 9

A test plaque is formed as described in Example 6, except that the sample used to form the plaque contained 50 wt. % HYDRAL 710, 49.5% ATEVA® 2803W, 0.25 wt. % stearic acid, and 0.25 wt. % zinc stearate. The test plaque was determined to have a water uptake (23° C.) of 0.1 wt. %. Further, the tensile elongation at break was also determined to be 1,000%.

Example 10

A sample is formed by compounding 40 wt. % ATEVA® 2803W and 60 wt. % ZEROGEN 100SP (a surface treated magnesium hydroxide) in a Haake mixer at a temperature of 150° C. The sample is then compression molded into a test plaque having a size of 3 cm×4 cm×1 mm (ASTM D4703-16, ISO 295:2004). The resulting test plaque was determined to have a water uptake (23° C.) of 0.060 wt. %. Further, the tensile elongation at break was also determined to be 150%.

Example 11

A test plaque is formed as described in Example 10, except that the sample used to form the plaque contained 60 wt. % ZEROGEN 100SP, 39.6% ATEVA® 2803W, 0.2 wt. % stearic acid, and 0.2 wt. % zinc stearate. The test plaque was determined to have a water uptake (23° C.) of 0.049 wt. %. Further, the tensile elongation at break was also determined to be 580%.

Example 12

A test plaque is formed as described in Example 10, except that the sample used to form the plaque contained 60 wt. % ZEROGEN 100SP, 39.2% ATEVA® 2803W, 0.2 wt. % stearic acid, and 0.6 wt. % zinc stearate. The test plaque was determined to have a water uptake (23° C.) of 0.043 wt. %. Further, the tensile elongation at break was also determined to be 510%.

Example 13

A test plaque is formed as described in Example 10, except that the sample used to form the plaque contained 60 wt. % ZEROGEN 100SP, 38.8% ATEVA® 2803W, 0.6 wt. % stearic acid, and 0.6 wt. % zinc stearate. The test plaque was determined to have a water uptake (23° C.) of 0.043 wt. %. Further, the tensile elongation at break was also determined to be 250%.

Example 14

A test plaque is formed as described in Example 10, except that the sample used to form the plaque contained 60 wt. % ZEROGEN 100SP, 35.6% ATEVA® 2803W, 4% ATEVA® 4030ACX, 0.2 wt. % stearic acid, and 0.2 wt. % zinc stearate. The test plaque was determined to have a water uptake (23° C.) of 0.055 wt. %. Further, the tensile elongation at break was also determined to be 910%.

Example 15

A test plaque is formed as described in Example 10, except that the sample used to form the plaque contained 60 wt. % ZEROGEN 100SP, 35.2% ATEVA® 2803W, 4% ATEVA® 4030ACX, 0.2 wt. % stearic acid, and 0.6 wt. % zinc stearate. The test plaque was determined to have a water uptake (23° C.) of 0.044 wt. %. Further, the tensile elongation at break was also determined to be 630%.

Example 16

A sample is formed by compounding 40 wt. % ATEVA® 2803W and 60 wt. % ZEROGEN 100SV (a surface treated magnesium hydroxide) in a Haake mixer at a temperature of 150° C. The sample is then compression molded into a test plaque having a size of 3 cm×4 cm×1 mm (ASTM D4703-16, ISO 295:2004). The resulting test plaque was determined to have a water uptake (23° C.) of 0.065 wt. %. Further, the tensile elongation at break was also determined to be 280%.

Example 17

A test plaque is formed as described in Example 16, except that the sample used to form the plaque contained 60 wt. % ZEROGEN 100SV, 36% ATEVA® 2803W, 3.6% ATEVA® 4030ACX, 0.2 wt. % stearic acid, and 0.2 wt. % zinc stearate. The test plaque was determined to have a water uptake (23° C.) of 0.051 wt. %. Further, the tensile elongation at break was also determined to be 610%.

Example 18

A test plaque is formed as described in Example 16, except that the sample used to form the plaque contained 60 wt. % ZEROGEN 100SV, 36% ATEVA® 2803W, 3.6% ATEVA® 4030ACX, and 0.4 wt. % stearic acid. The test plaque was determined to have a water uptake (23° C.) of 0.049 wt. %. Further, the tensile elongation at break was also determined to be 800%.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A polymer composition comprising one or more ethylene vinyl acetate polymers in an amount of from about 20 wt. % to about 75 wt. %, a flame retardant that includes a halogen-free mineral filler, and a compatibilizing agent, wherein the halogen-free mineral filler constitutes from about 20 wt. % to about 80 wt. % of the composition and wherein the compatibilizing agent constitutes from about 0.1 wt. % to about 6 wt. %, based on the weight of ethylene vinyl acetate polymers in the composition, and further wherein the composition exhibits a degree of water uptake of about 5 wt. % or less after being immersed in water for seven days at a temperature of 23° C.

2. The polymer composition of claim 1, wherein the composition exhibits a tensile elongation at break of about 100% or more as determined in accordance with ISO Test No. 527-1:2012 at 23° C.

3. The polymer composition of claim 1, wherein the composition contains an ethylene vinyl acetate polymer that has a vinyl acetate content of from about 10 wt. % to about 45 wt. %.

4. The polymer composition of claim 1, wherein the composition contains an ethylene vinyl acetate polymer that has a melt flow index of from about 0.1 to about 30 g/10 min as determined in accordance with ASTM D1238-13 at a temperature of 190° C. and a load of 2.16 kilograms.

5. The polymer composition of claim 1, wherein the composition contains an ethylene vinyl acetate polymer having a vinyl acetate content of from about 10 wt. % to about 38 wt. % and an ethylene vinyl acetate rubber having a vinyl acetate content of from about 38 wt. % to about 95 wt. %.

6. The polymer composition of claim 1, wherein the composition contains about 10,000 parts per million or less of halogens.

7. The polymer composition of claim 1, wherein the halogen-free mineral filler is a metal hydroxide.

8. The polymer composition of claim 7, wherein the metal hydroxide includes aluminum trihydroxide, magnesium hydroxide, or a combination thereof.

9. The polymer composition of claim 1, wherein the mineral filler is in the form of particles having a median size of from about 50 nanometers to about 3,000 nanometers.

10. The polymer composition of claim 1, wherein the compatibilizing agent includes a fatty acid, fatty acid derivative, wax, or a combination thereof.

11. The polymer composition of claim 1, wherein the compatibilizing agent includes a fatty acid having a carbon chain length of from about 8 to 22 carbon atoms.

12. The polymer composition of claim 11, wherein the fatty acid includes lauric acid, myristic acid, behenic acid, oleic acid, palmitic acid, stearic acid, ricinoleic acid, capric acid, neodecanoic acid, hydrogenated tallow fatty acid, hydroxy stearic acid, the fatty acids of hydrogenated castor oil, erucic acid, coconut oil fatty acid, or a combination thereof.

13. The polymer composition of claim 1, wherein the compatibilizing agent includes a salt of a fatty acid having a carbon chain length of from about 8 to 22 carbon atoms.

14. The polymer composition of claim 13, wherein the salt contains a metal cation.

15. The polymer composition of claim 14, wherein the salt includes zinc stearate, aluminum stearate, magnesium stearate, calcium stearate, sodium stearate, lithium stearate, or a combination thereof.

16. The polymer composition of claim 1, wherein the composition is crosslinked.

17. A cable comprising the polymer composition of claim 1.

18. The cable of claim 17, wherein the cable includes an elongated protective member that defines a passageway for receiving one or more items, wherein the protective member includes the polymer composition.

19. The cable of claim 18, wherein the protective member covers one or multiple conductors.

20. The cable of claim 19, wherein the conductors include copper wire.

21. A cable that includes an elongated protective member that defines a passageway for receiving one or more items, wherein the protective member includes the polymer composition comprising one or more ethylene vinyl acetate polymers in an amount of from about 20 wt. % to about 75 wt. %, a flame retardant that includes a halogen-free mineral filler, and a compatibilizing agent, wherein the halogen-free mineral filler constitutes from about 20 wt. % to about 80 wt. % of the composition and wherein the compatibilizing agent constitutes from about 0.1 wt. % to about 6 wt. %, based on the weight of ethylene vinyl acetate polymers in the composition.

22. The cable of claim 21, wherein the composition exhibits a degree of water uptake of about 5 wt. % or less after being immersed in water for seven days at a temperature of 23° C.

23. The cable of claim 21, wherein the protective member covers one or multiple conductors.

24. The cable of claim 21, wherein the conductors include copper wire.

25. The cable of claim 21, wherein the composition exhibits a tensile elongation at break of about 100% or more as determined in accordance with ISO Test No. 527-1:2012 at 23° C.

* * * * *